United States Patent
Weber

(10) Patent No.: US 7,404,478 B2
(45) Date of Patent: Jul. 29, 2008

(54) DISTRIBUTION DEVICE

(75) Inventor: Gunther Weber, Zachow (DE)

(73) Assignee: Weber Maschinenbau GmbH & Co. KG, Breidenbach (DE)

( * ) Notice: Subject to any disclaimer, the term of this patent is extended or adjusted under 35 U.S.C. 154(b) by 726 days.

(21) Appl. No.: 10/487,193

(22) PCT Filed: Sep. 4, 2002

(86) PCT No.: PCT/EP02/09907

§ 371 (c)(1),
(2), (4) Date: Apr. 13, 2004

(87) PCT Pub. No.: WO03/022716

PCT Pub. Date: Mar. 20, 2003

(65) Prior Publication Data

US 2004/0159246 A1    Aug. 19, 2004

(30) Foreign Application Priority Data

Sep. 5, 2001    (DE)   ............... 101 43 506
May 31, 2002    (EP)   ............... 02012125

(51) Int. Cl.
*B65G 47/71*    (2006.01)
*B65G 47/64*    (2006.01)

(52) U.S. Cl. ............... 198/457.03; 198/457.01

(58) Field of Classification Search ........... 198/429, 198/436, 597, 601, 457.01, 457.03, 369.2, 198/369.7
See application file for complete search history.

(56) References Cited

U.S. PATENT DOCUMENTS

| | | | | |
|---|---|---|---|---|
| 2,671,549 | A | * | 3/1954 | Lubetkin ............... 198/445 |
| 3,440,974 | A | * | 4/1969 | Ruiz ............... 425/363 |
| 4,934,232 | A | | 6/1990 | Weber et al. ............... 83/355 |
| 5,209,339 | A | | 5/1993 | Antonissen ............... 198/436 |
| 5,421,446 | A | * | 6/1995 | Koch et al. ............... 198/369.7 |
| 5,634,549 | A | | 6/1997 | Mims ............... 198/441 |
| 5,640,833 | A | * | 6/1997 | Gerber ............... 53/443 |
| 5,655,667 | A | * | 8/1997 | Isaacs ............... 209/539 |
| 5,810,149 | A | | 9/1998 | Sandberg et al. ............... 198/369.2 |
| 6,015,039 | A | * | 1/2000 | Bonnet ............... 198/368 |

(Continued)

FOREIGN PATENT DOCUMENTS

DE             619395        10/1935

(Continued)

*Primary Examiner*—Douglas A Hess
(74) *Attorney, Agent, or Firm*—Gifford, Krass, Sprinkle, Anderson & Citkowski

(57) ABSTRACT

A distributor apparatus for products having an infeed belt and an outfeed belt which are aligned with each other in a conveying direction. A distributor belt is arranged in the conveying direction between the infeed belt and the outfeed belt and this conveyor belt is movable transversely with respect to the conveying direction. The distributor belt includes at least two belt parts which are transversely positioned with respect to each other and movable transversely in unison with each other as a unit. Two independent operable dives mechanically drive the parts of the distributor belt so that products may be outfeed from the infeed belt and to the outfeed belt in transversely arranged groups of product. By controlling the operation of the belt parts of the distributor belt, the number of transverse groups of product on the outfeed belt may be varied.

21 Claims, 7 Drawing Sheets

U.S. PATENT DOCUMENTS

Figure 1:
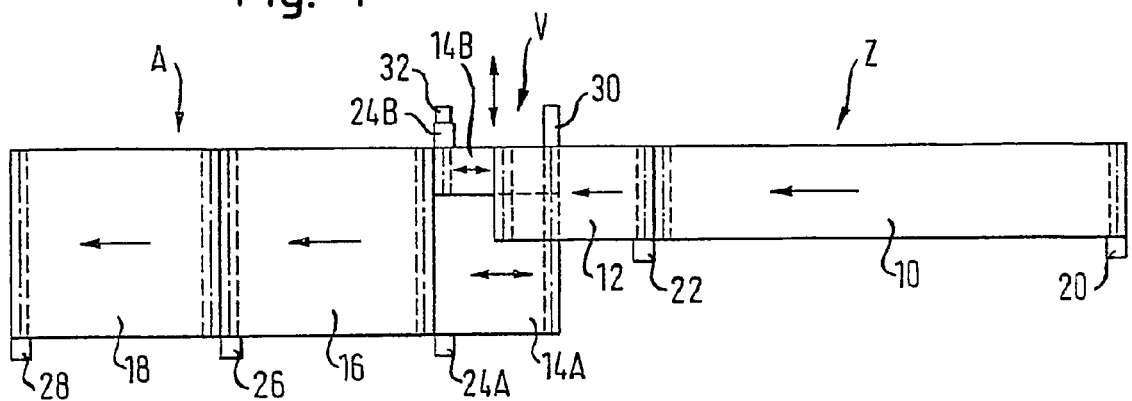

| | | |
|---|---|---|
| 6,202,828 B1 * | 3/2001 | Roskam ................. 198/457.03 |
| 6,227,376 B1 * | 5/2001 | Handel et al. ............... 209/606 |
| 6,435,352 B1 * | 8/2002 | Schoenbeck et al. ........ 209/509 |
| 6,609,607 B2 * | 8/2003 | Woltjer et al. .......... 198/457.03 |
| 6,659,445 B2 * | 12/2003 | Boss ......................... 271/9.13 |
| 6,789,328 B2 * | 9/2004 | Beckhart et al. .............. 33/645 |
| 6,962,250 B2 * | 11/2005 | Van Liempd et al. ... 198/457.06 |
| 6,981,581 B2 * | 1/2006 | Salvoni ...................... 198/436 |

FOREIGN PATENT DOCUMENTS

| | | |
|---|---|---|
| DE | 26 56 956 C3 | 8/1981 |
| DE | 35 04 365 A1 | 10/1986 |
| DE | 196 17 187 | 10/1997 |
| EP | 0 067 421 A2 | 12/1982 |

\* cited by examiner (a)

(b)

(c)

(d)

(e)

(f)

(a)

(b)

(c)

(d)

(e)

(f)

(a)

(b)

(c)

(d)

(e)

(f)

(g)

(h)

(i)

DISTRIBUTION DEVICE

The present invention relates to a distributor apparatus for products, in particular for food products cut into slices.

When cutting and portioning food products, high-performance slicers are used today with which the food products are cut into thin slices. The slices are subsequently layered in stacks or in overlapping portions, are weighed and are packed in a packaging machine. It is desirable in this process to distribute the products of an incoming product flow such that the outgoing product flow has a different grouping. For example, the incoming product flow can include individual products arranged in the conveying direction one after the other, whereas the outgoing product flow has groups in which two, three, four or more products are arranged next to one another.

It is the object of the present invention to provide a distributor apparatus for products which has a high flexibility with respect to the distribution variants.

This object is satisfied by the features of claim 1 and in particular by a distributor apparatus for products having an infeed belt and an outfeed belt which are arranged in the conveying direction one after the other. At least one distributor belt is furthermore provided which is arranged in the conveying direction between the infeed belt and the outfeed belt. In accordance with the invention, the distributor belt is driven in and counter to the conveying direction and is displaceable transversely to the conveying direction. The distributor belt is divided at least into two in the conveying direction, with each part of the distributor belt having a drive. The drives are independent of one another, i.e. they can be driven independently of one another in or counter to the conveying direction.

An incoming product flow can be divided in an extremely flexible manner into an outgoing product flow of a different grouping by the distributor apparatus in accordance with the invention. It is in particular possible by using at least one divided distributor belt with independent drives to distribute an incoming product flow such that the members of a grouping are distributed from an even number to an odd number (or vice versa).

Any desired products can be used within the framework of this invention. The invention is, however, particularly suitable for the distribution of cut food products which can be supplied either individually or as overlapping or stacked portions.

Advantageous embodiments of the invention are described in the description, in the claims and in the drawing.

In accordance with a first advantageous embodiment, at least one distributor belt has substantially the same width as the outfeed belt and is in particular wider than the infeed belt. It is hereby possible to achieve a broadening of the incoming product flow by the distributor apparatus.

In accordance with a further advantageous embodiment, the infeed belt is arranged above at least one distributor belt and is in particular downwardly inclined at least regionally. The incoming product flow can hereby be transferred gently from the infeed belt to the distributor belt.

The infeed belt preferably overlaps a distributor belt at least partly, whereby it is achieved that products can be conveyed from the distributor belt behind the front end of the infeed belt such that a following product supplied by the infeed belt can be placed next to the product already placed on the distributor belt.

In accordance with a further advantageous embodiment of the invention, the infeed belt and at least one distributor belt are vertically spaced apart above one another such that products located on the distributor belt can be conveyed beneath the infeed belt. With this embodiment, it is possible, on a reverse movement of the distributor belt, to guide products already located on the distributor belt beneath the infeed belt, whereby higher distributor speeds are achieved, without the products located on the distributor belt being impaired.

In a further embodiment of the invention, two distributor belts are arranged in the conveying direction one after the other between the infeed belt and the outfeed belt. The distributor belts in this process are displaceable independently of one another transversely to the conveying direction and the parts of the distributor belts are driven independently of one another in and counter to the conveying direction. In this manner, practically all redistributions can be realized, in particular the distribution of the groupings of a product flow from an odd number to an even number.

In this embodiment, the distributor belts can moreover be displaceable simultaneously in the same direction or in the opposite direction transversely to the conveying direction. This permits an extremely fast and versatile distribution of the product flow, because regroupings can be carried out simultaneously on both distributor belts.

Figure 2:
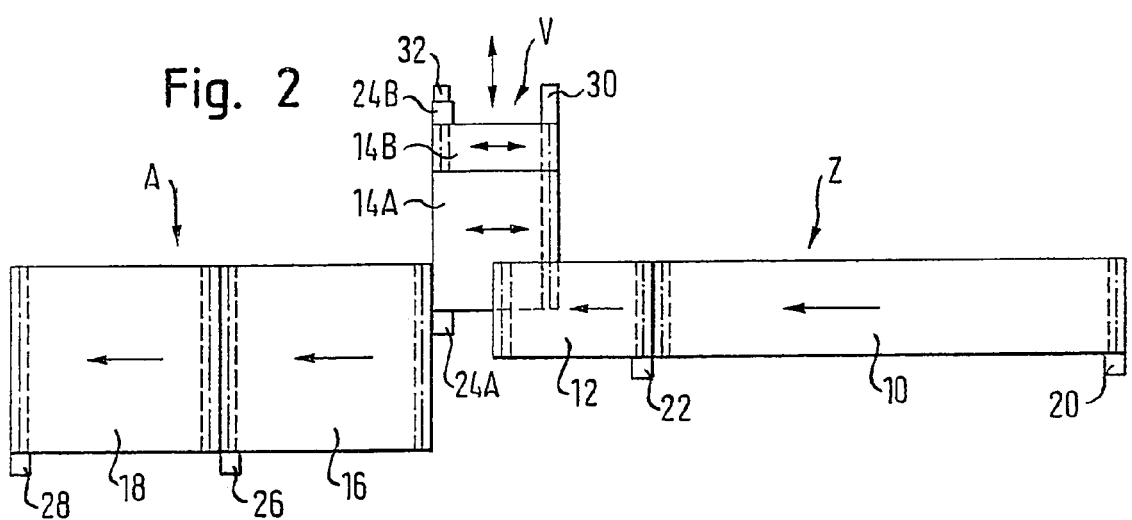
Figure 3:
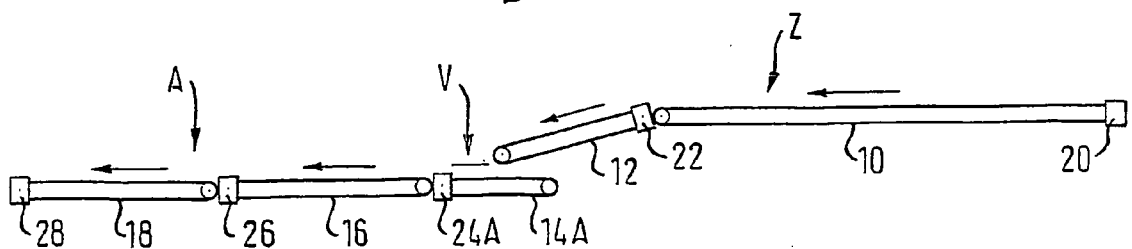
Figure 6:
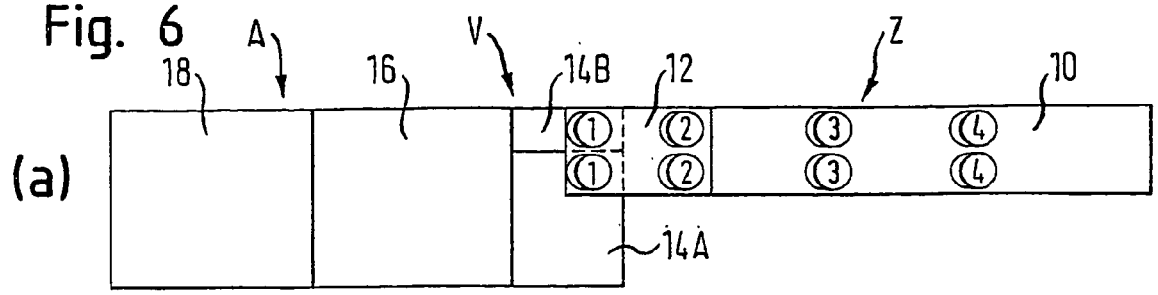
Figure 6:
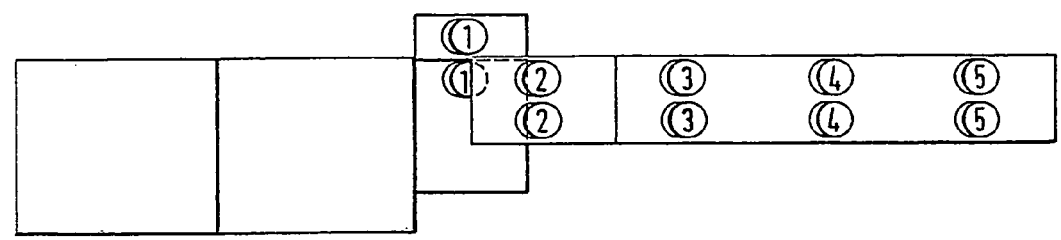
Figure 6:
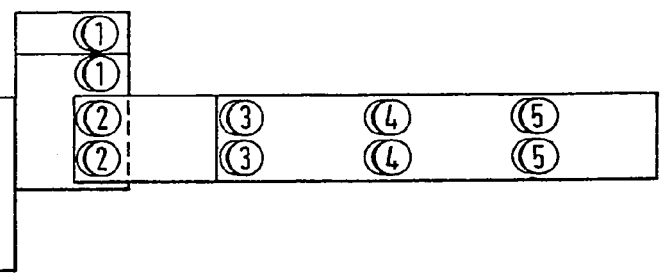
Figure 6:
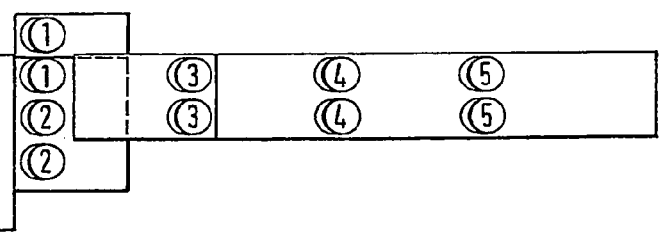
Figure 6:
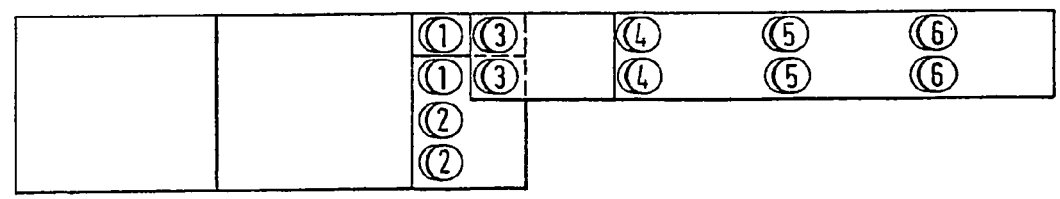
Figure 6:
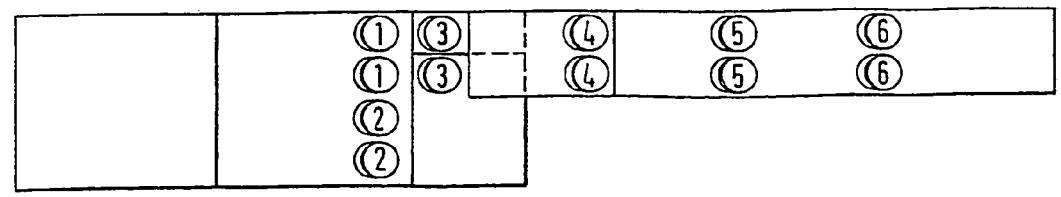
Figure 7:
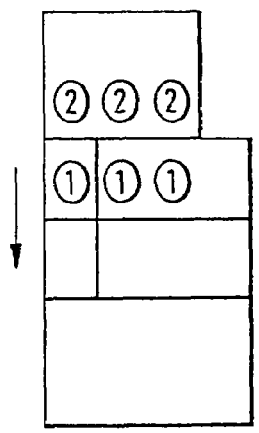
Figure 7:
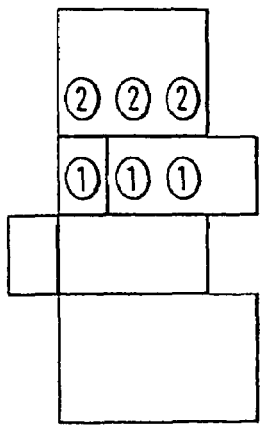
Figure 7:
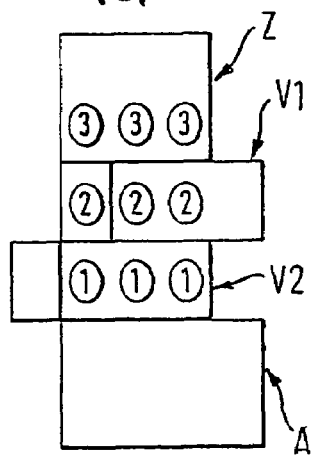
Figure 7:
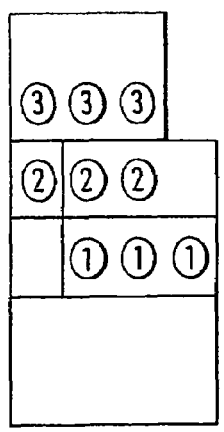
Figure 7:
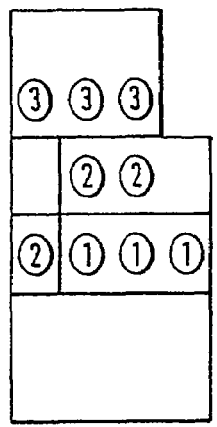
Figure 7:
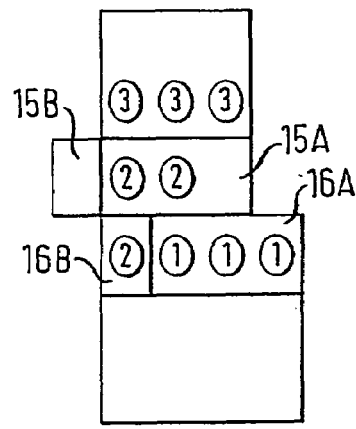
Figure 7:
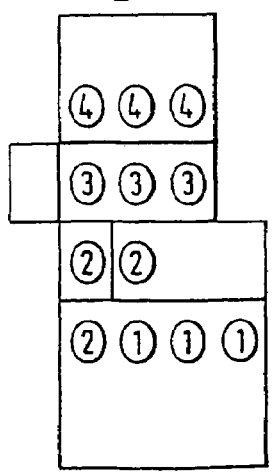
Figure 7:
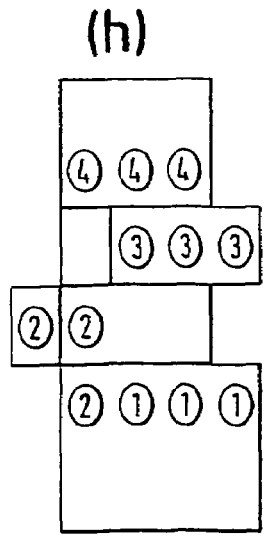
Figure 7:
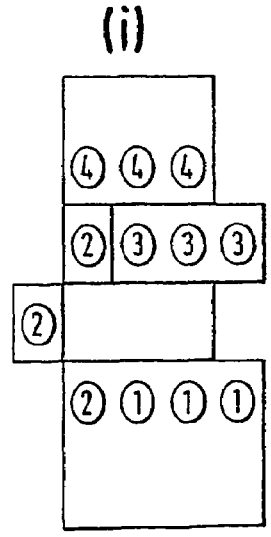
Figure 7:
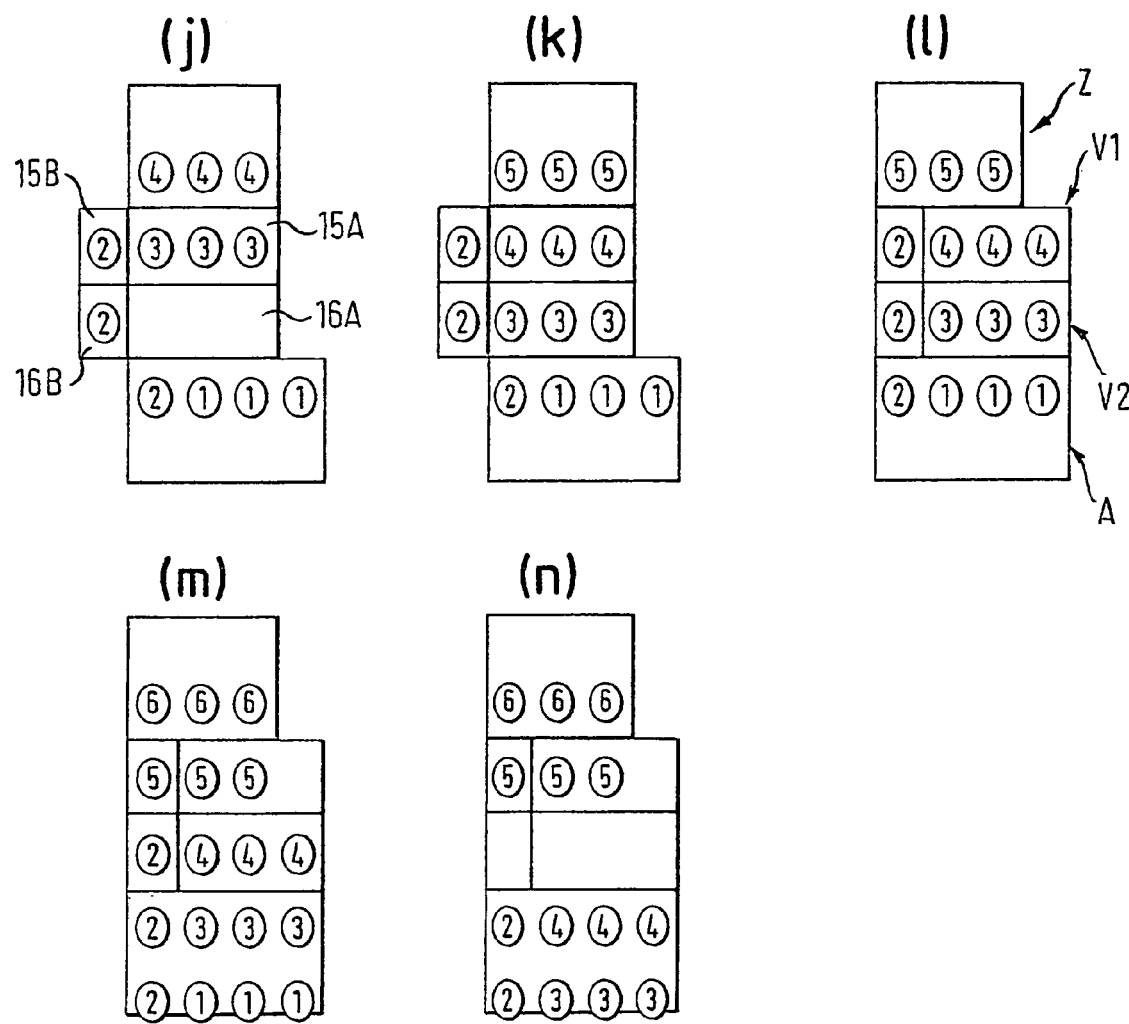

The present invention will be described in the following purely by way of example with reference to advantageous embodiments and to the enclosed drawings. There are shown:

FIG. 1 a plan view of a first embodiment of a distributor apparatus, with the distributor belt being located in its left hand end position;

FIG. 2 a plan view of the distributor apparatus of FIG. 1, with the distributor belt being located in its right hand end position;

FIG. 3 a side view of the distributor apparatus of FIGS. 1 and 2;

FIGS. 4a-4i a schematic procedure of a ¼ distribution with the first embodiment;

FIGS. 5a-5h a schematic procedure of a ⅔ distribution with the first embodiment;

FIG. 6 a schematic procedure of a 2/4 distribution with the first embodiment; and FIG. 7 a schematic procedure of a ¾ distribution with a second embodiment.

FIGS. 1 to 3 show a first embodiment of a distributor apparatus in accordance with the invention comprising an infeed belt Z, an outfeed belt A and a distributor belt V, with the infeed belt, the distributor belt and the outfeed belt being arranged in the conveying direction one after the other. As can be recognized, the infeed belt Z has two conveyor belts 10 and 12 arranged in the conveying direction one after the other and the outfeed belt A has two conveyor belts 16, 18 arranged one after the other. The conveyor belts 10 and 12 of the infeed belt Z adjoin one another directly, with the conveyor belt 12 being downwardly inclined at its front end in the conveying direction with respect to its rear end which is aligned with the front end of the conveyor belt 10. The conveyor belt 10 is many times longer than the conveyor belt 12. Both conveyor belts 10 and 12 are driven in the conveying direction marked by arrows. The two conveyor belts 16 and 18 of the outfeed belt A are arranged directly adjoining one another one after the other in one plane and are driven in the conveying direction shown. The reference numerals 20 and 22 designate the drives of the conveyor belts 10 and 12 and the reference numerals 26, 28 designate the drives of the conveyor belts 16 and 18.

As FIGS. 1 to 3 show, the distributor belt V is divided into two in the conveying direction and has two conveyor belts 14A and 14B which are arranged in parallel and coaxially and which each have drives 24A and 24B independent of one another. The conveyor belts 14A and 14B can be moved independently of one another in and counter to the conveying direction with the help of the two drives.

The distributor belt V, i.e. the two conveyor belts 14A and 14B arranged next to one another, are additionally displaceable transversely to the conveying direction with the help of a displacement device, as is indicated by a double arrow in FIGS. 1 and 2. The displacement device is formed by two linear drives 30, 32.

As in particular FIGS. 1 and 2 show, the distributor belt V substantially has the same width as the outfeed belt A. Both belts are approximately twice as wide as the infeed belt Z. The width of the conveyor belt 14B amounts to approximately a quarter of the width of the conveyor belt 16 and to approximately a third of the conveyor belt 14A. The Figures furthermore show that the conveyor belt 12 of the infeed belt Z overlaps the distributor belt V, with the front end of the conveyor belt 12 in the transport direction being located approximately at the center of the distributor belt V. The front end of the conveyor belt 12 in the transport direction is furthermore spaced apart vertically with respect to the surface of the distributor belt V such that products can be transported beneath the conveyor belt 12.

Figure 4:
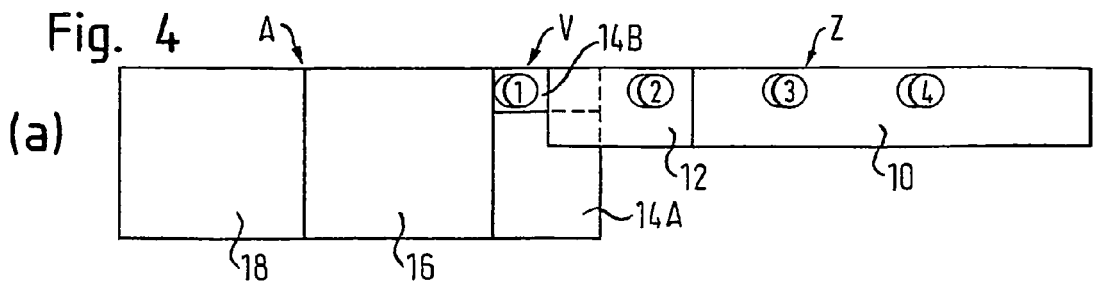
Figure 4:
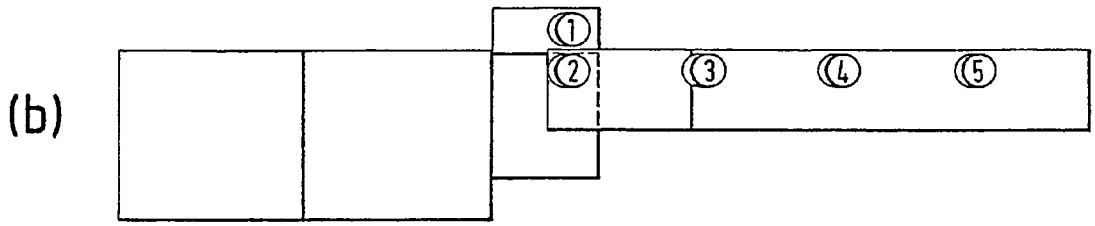
Figure 4:
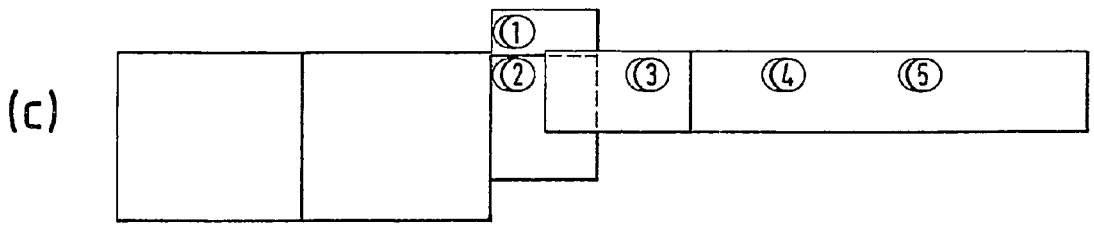
Figure 4:
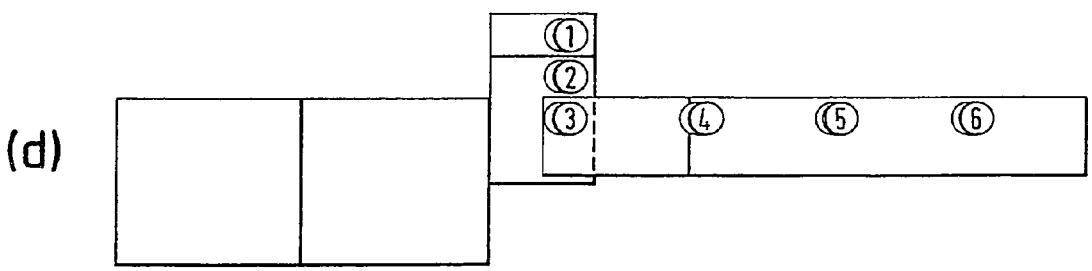
Figure 4:
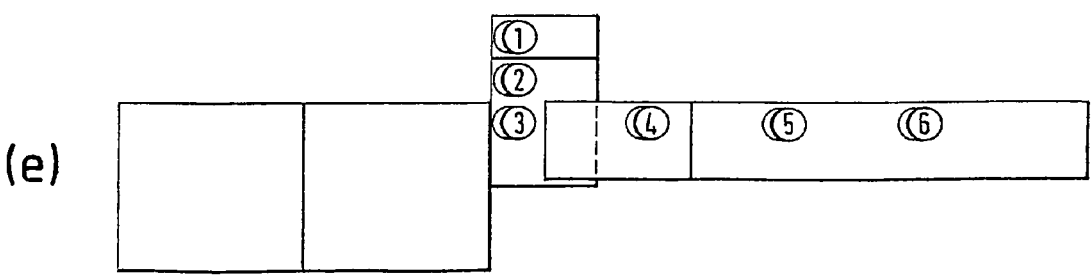
Figure 4:
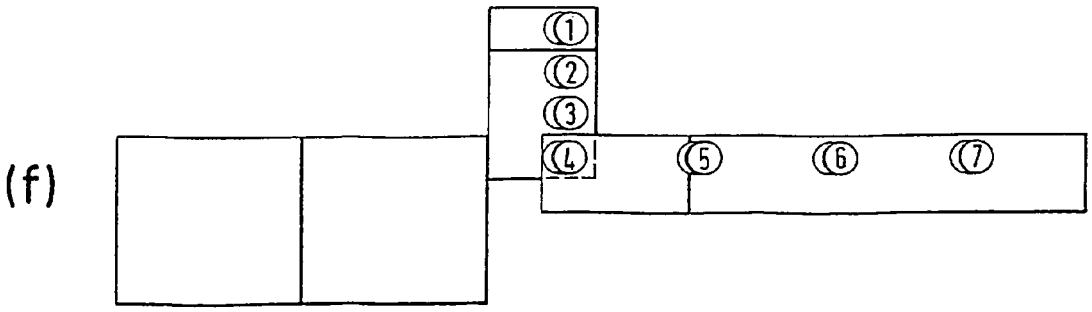
Figure 4:
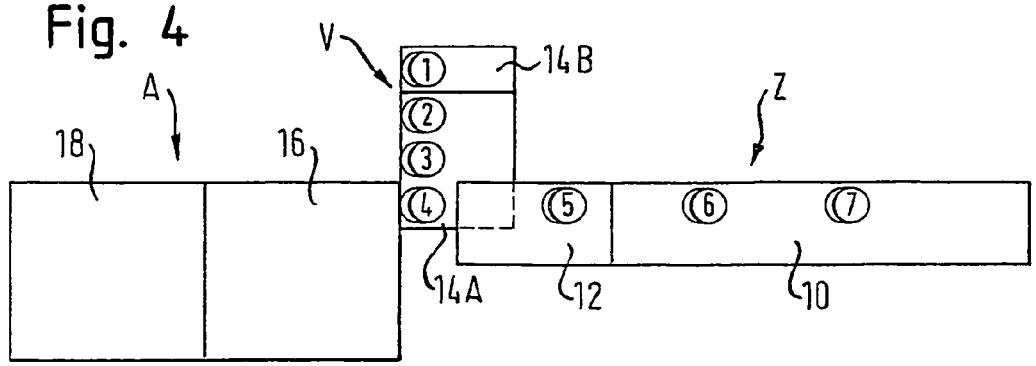
Figure 4:
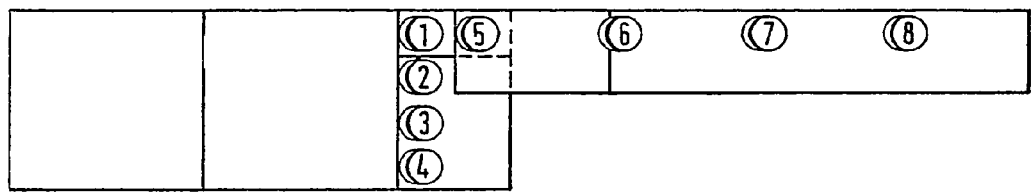
Figure 4:
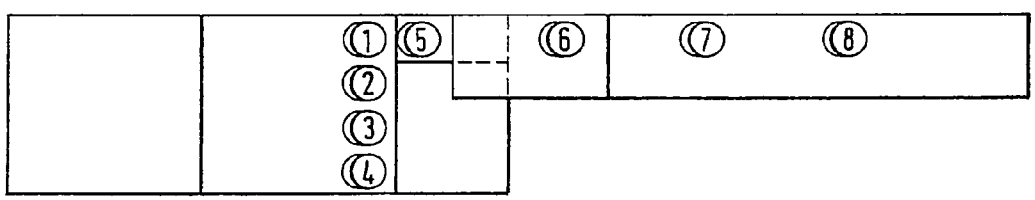
Figure 5:
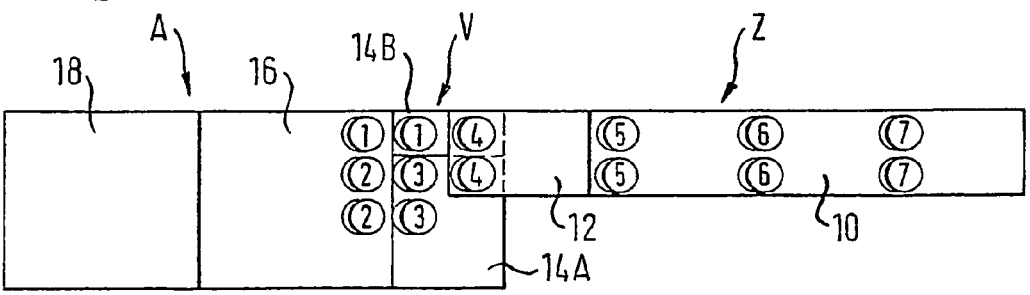
Figure 5:
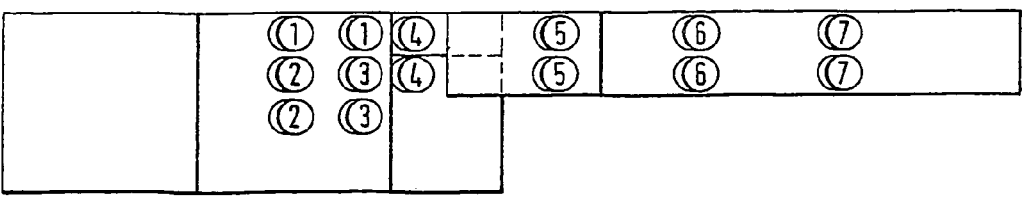
Figure 5:
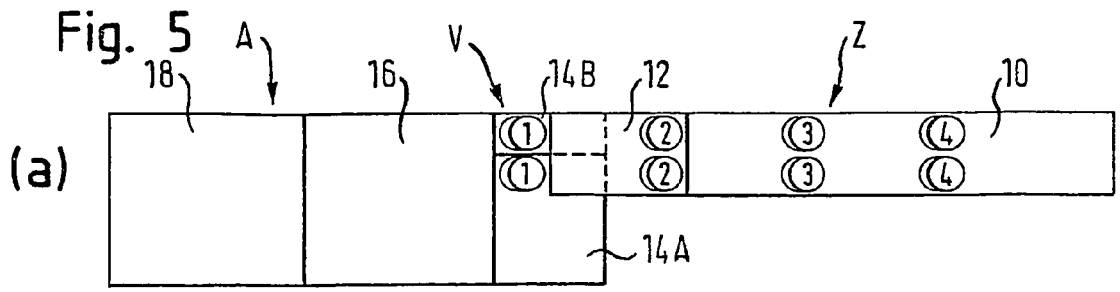
Figure 5:
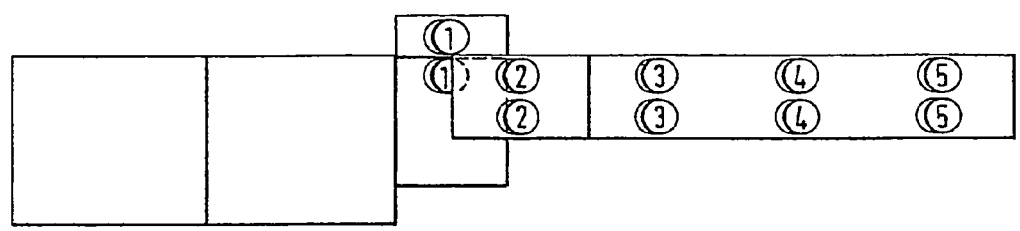
Figure 5:
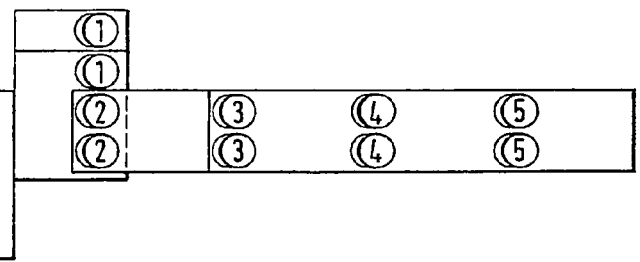
Figure 5:
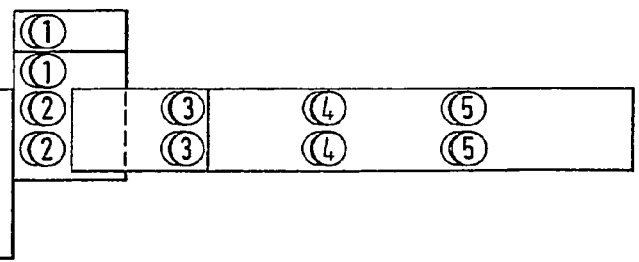
Figure 5:
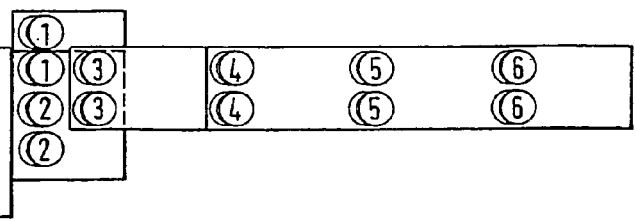
Figure 5:
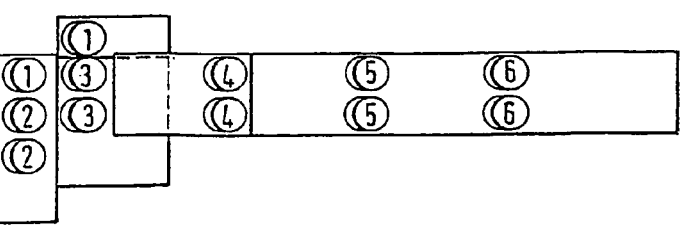

FIGS. 4 to 6 show different procedures of the first embodiment shown in FIGS. 1 to 3, with details of the distributor apparatus not being shown in FIGS. 4 to 6.

In FIGS. 4a to 4i, a so-called ¼ distribution is shown in which the infed products, which are marked with consecutive numbers 1 to 8, are supplied in groups with one member and the outfeed products are outfeed in groups with four members which lie next to one another transversely to the conveying direction. A product is understood as a single product, as an overlapping product portion or as a stacked product portion.

FIG. 4a shows a state in which the first supplied product has already been transferred from the conveyor belt 12 of the infeed conveyor Z to the conveyor belt 14B of the distributor belt V. Before the product with the number 2 is transferred onto the distributor belt V, it is transversely displaced by a product width. At the same time, the conveyor belt 14B is displaced counter to the conveying direction such that, when the product with the number 2 is transferred, both conveyor belts 14A and 14B can be moved synchronously in the conveying direction such that both products 1 and 2 come to lie aligned next to one another.

Subsequently, a further transverse movement and a further reverse movement is carried out by the distributor belt V such that the product with the number 3 can be transferred to the distributor belt V in the manner described above (cf. FIGS. 4d and e).

As FIG. 4f shows, a further transverse movement and another reverse movement of the distributor belt V are subsequently carried out such that subsequently the product with the number 4 can be transferred from the infeed belt to the distributor belt.

The distributor belt V is subsequently moved back into its left hand end position (cf. FIG. 4h) such that subsequently all four products with the numbers 1 to 4 arranged next to one another can be transferred to the outfeed belt A. At the same time, the first following product No. 5 of the next group is transferred from the infeed belt to the distributor belt such that the next distribution cycle can start.

FIG. 5 shows a representation of a distribution similar to FIG. 4, with a ⅔ distribution being shown in FIG. 5, i.e. the incoming product flow has product groups which each consist of two products arranged next to one another transversely to the conveying direction, with such a distribution taking place that the outfeed product flow has respective groups which consist of three products arranged next to one another transversely to the conveying direction.

As is shown in FIG. 5a, initially the product pair with the number 1 is transferred from the infeed belt to the distributor belt. The distributor belt V is subsequently displaced by twice a product width transversely to the conveying direction and simultaneously the two conveyor belts 14A and 14B are moved rearwardly counter to the conveying direction (FIGS. 5b and c). Subsequently, both conveyor belts 14A and 14B are moved synchronously to one another and also synchronously to the conveyor belt 12 in the conveying direction such that the product pair with the number 2 can be placed down aligned with the product pair with the number 1 on the distributor belt (FIG. 5d).

Subsequently, the distributor belt V is moved back by a product width transversely to the conveying direction (FIG. 5e), whereupon the conveyor belt 14A of the distributor belt, but not the conveyor belt 14B, is moved in the conveying direction and together with the conveyor belt 16 of the outfeed belt such that the first product group, consisting of three products arranged next to one another transversely to the conveying direction, can be placed on the outfeed belt (cf. FIG. 5f). At the same time, the following product pair with the number 3 is transferred from the infeed belt to the distributor belt.

In the following step, the distributor belt is guided back into its left hand end position such that the next group of three can be transferred from the distributor belt V to the conveyor belt 16 of the outfeed belt A. At the same time, the next following group of two with the number 4 is transferred from the infeed belt to the distributor belt such that the distribution cycle can start again.

As becomes clear from the above, it is important in this distribution that the distributor belt has two part belts drivable independently of one another.

FIG. 6 shows a ⅔ distribution in which an incoming product flow with product pairs is divided into an outgoing product flow with a group of four members.

As FIG. 6a shows, the distributor belt is initially located in its left hand end position, i.e. aligned with the outfeed belt A, and the first product pair with the number 1 is transferred from the conveyor belt 12 of the infeed belt Z to the distributor belt V. Subsequently, the distributor belt V is displaced by two product widths transversely to the conveying direction and is moved rearwardly counter to the conveying direction such that in the subsequent step (FIG. 6c) the product pair with the number 2 can be transferred onto the distributor belt V in a manner aligned with the product pair with the number 1. Subsequently, the distributor belt V is move back into its left hand end position (FIG. 6e) and the four products of the product groups with the numbers 1 and 2, which are already arranged next to one another aligned transversely to the conveying direction, can be transferred to the conveyor belt 16 of the outfeed belt A by a synchronous movement of the distributor belt V and of the outfeed belt A. At the same time, the next supplied product group with the number 2, which includes two products arranged next to one another, can be transferred from the conveyor belt 12 of the infeed belt Z to the distributor belt V such that the distribution cycle can start again.

As in particular FIGS. 5b and c show, the transverse movement of the distributor belt V and its reverse movement can be combined with one another such that products or product pairs are conveyed slantingly to the conveying direction. A multiple braking and accelerating of the conveyor belt is hereby avoided. At the same time, the products or product pairs can be guided beneath the infeed belt, whereby higher distribution speeds are achieved.

In FIGS. 7a-7n, the schematic procedure of a ¾ distribution is shown using a second embodiment of the distributor apparatus in accordance with the invention. The distributor apparatus is shown schematically in this. The arrow shown in FIG. 7a indicates the conveying direction, i.e. the transport direction.

In the second embodiment, two distributor belts V1 and v2 are arranged in the conveying direction one after the other between the infeed belt Z and the outfeed belt A. The distributor belts V1 and V2 adjoin one another directly in an aligned manner. They are driven independently of one another in the conveying direction.

The distributor belts V1 and V2 are furthermore displaceable independently of one another transversely to the conveying direction by linear drives not shown in FIG. 7. They can thus also be displaced simultaneously in the same direction or in the opposite direction transversely to the conveying direction.

The distributor belts V1 and V2 both have approximately the same width as the outfeed belt A. The width of the infeed belt Z amounts to approximately three quarters of the width of the outfeed belt A. The distributor belt V1 directly adjoins the infeed belt Z in one plane, whereas the distributor belt V2 directly adjoins the outfeed belt A in the same plane.

The distributor belts V1 and V2, like the distributor belt V of the first embodiment, are divided into two and each consist of two conveyor belts 15A, 15B and 16A, 16B respectively arranged in parallel and coaxially with independent drives. All four conveyor belts can be moved in and counter to the conveying direction independently of one another.

The conveyor belts 15A and 16A are approximately equally large and arranged in the conveying direction one after the other. Moreover, the approximately equally large conveyor belts 15B and 16B are arranged in the conveying direction one after the other. The width of the conveyor belts 15A and 16A amounts to approximately three quarters and the width of the conveyor belts 15B and 16B amounts to approximately a quarter of the width of the respective distributor belts V1 and V2.

FIGS. 7a-7n represent a so-called ¾ distribution. The products are marked with the numbers 1 to 6 and are supplied in groups of three on the infeed belt Z.

FIG. 7a shows a state in which a group of three products with the number combination 1-1-1 supplied from infeed belt Z has already been placed on the distributor belt V1. Then, as shown in FIG. 7b, the distributor belt V2 is moved by a transverse movement by a product width into its right hand end position as seen in the conveying direction. In the next step, the products with the numbers 1-1-1 are moved, as shown in FIG. 7c, onto the distributor belt V2. At the same time, a group of three products with the numbers 2-2-2 is transferred from the infeed belt Z onto the distributor belt V1. Then the distributor belt V2 is displaced by a product width transversely to the conveying direction into its left hand end position shown in FIG. 7d.

Subsequently, as indicated in FIG. 7e, a product with the number 2 is transferred in the conveying direction from the conveyor belt 15B onto the conveyor belt 16B so that the distributor belt V2 is completely occupied with a group of four consisting of three products of the number 1 and one product of the number 2 (number combination 2-1-1-1 in FIG. 7e).

The distributor belt V1 is then displaced by a transverse movement into its right hand end position (FIG. 7f). Thereupon, as shown in FIG. 7g, all belts, i.e. the infeed belt Z, the distributor belts V1 and V2 and the outfeed belt A, are set into motion in order to transfer the products present on the respective belts in the conveying direction onto the next belt. The group of four with the numbers 2-1-1-1 is thus moved to the outfeed belt A and the regrouping of a group of three to a group of four is completed.

In the next step, which is shown in FIG. 7h, the distributor belts V1 and V2 are each displaced with respect to one another by a transverse movement such that the distributor belt V1 is located in its left hand end position and the distributor belt V2 is located in its right hand end position. Then a product with the number 2 is transferred from the conveyor belt 16B onto the conveyor belt 15B by a reverse movement of the conveyor belts 16B and 15B counter to the conveying direction (FIG. 7i). Subsequently, the distributor belt V1 is also displaced transversely to the transport direction into its right hand end position, shown in FIG. 7j.

Then the infeed belt Z and the conveyor belt 15A are set into motion in the transport direction, whereby the group of three with the number combination 3-3-3 present on the conveyor belt 15A is placed on the conveyor belt 16A. At the same time, a group of three with the number combination 4-4-4 is transferred from the infeed belt Z onto the conveyor belt 15A. In this state (FIG. 7k), a group of four 2-3-3-3 is located on the distributor belt V2 and a group of four 2-4-4-4 on the distributor belt V1.

Now transverse movements are carried out simultaneously by the distributor belts V1 and V2 in order to displace them by a product width in to their left hand end positions (FIG. 7l). All belts are then set into motion in the conveying direction. The group of four 2-1-1-1 present on the outfeed belt A is then transferred further by a product length on the outfeed belt. At the same time, the group of four 2-3-3-3 on the distributor belt V3 is transferred onto the outfeed belt A. The group of four 2-4-4-4 present on the distributor belt V1 is simultaneously placed on the distributor belt V2 and a group of three with the number combination 5-5-5 is transferred from the infeed belt Z to the distributor belt V1 (FIG. 7m).

The distributor belt V2 and the outfeed belt A are then moved on in the conveying direction to transport the group of four 2-3-3-3 on the outfeed belt A onward by a product length and to transfer the group of four 2-4-4-4 from the distributor belt V2 onto the outfeed belt A (FIG. 7n). A cycle of the regrouping of four groups of three to three groups of four is thus completed.

A product group can be distributed from an odd number into an even number using the second embodiment of the distributor apparatus in accordance with the invention. Moreover, a faster and thus more efficient distribution of the products is made possible by the use of two distributor belts on which regroupings take place simultaneously.

To summarize, it can be said that practically all conceivable redistributions of product groupings can be realized using the distributor apparatus in accordance with the invention. This can occur, as described in the first and second embodiments, by the use of one or two distributor belts. Alternatively, a high flexibility of the distributor apparatus can be achieved by arranging a plurality of distributor belts one after the other and by the redistributing use of one or more distributor belts in dependence on the respectively needed distribution variant.

Moreover, the distributor belts can not only be divided in a ratio of 1:3, i.e. asymmetrically, but it is rather the case that other asymmetrical or symmetrical divisions of the distributor belts are also conceivable to realize a versatile use of the distributor apparatus.

The invention claimed is:

1. A distributor apparatus for products, comprising
an infeed belt and an outfeed belt which are arranged in the conveying direction one after the other; and
at least one distributor belt which is arranged in the conveying direction between the infeed belt and the outfeed belt, wherein:
the distributor belt is driven in and counter to the conveying direction and is displaceable transversely to the conveying direction, the distributor belt is divided at least into two in the conveying direction; and
each part of the distributor belt has a drive, with the drives being independent of one another
characterized in that two distributor belts are arranged in the conveying direction one after the other between the infeed belt and the outfeed belt, with the distributor belts being displaceable independently of one another transversely to the conveying direction and the parts of the distributor belts being driven independently of one another in and counter to the conveying direction.

2. A distributor apparatus in accordance with claim 1, characterized in that the distributor belts are displaceable simultaneously in the same direction or in the opposite direction transversely to the conveying direction.

3. A method for the distribution of products supplied on a conveyor belt using a distributor apparatus in accordance with claim 1, wherein a distribution of the supplied products takes place by a selected driving of the parts of at least one distributor belt in and counter to the conveying direction and by displacement of at least one distributor belt transversely to the conveying direction, characterized in that the infed products and the outfeed products are arranged in groups next to one another, with the number m of the members of an outfeed group not being an integral multiple of the number n of members of the infed group.

4. A method in accordance with claim 3, characterized in that the infeed belt and at least one distributor belt are at times moved synchronously in the conveying direction.

5. A method in accordance with claim 3, characterized in that two distributor belts are displaced at times simultaneously in the same direction or in the opposite direction, transversely to the conveying direction.

6. A distributor apparatus for products comprising
an infeed belt and an outfeed belt, said belts being aligned with each other in a conveying direction with the outfeed belt being positioned after the infeed belt with respect to the conveying direction,
at least one distributor belt arranged in the conveying direction between the infeed belt and the outfeed belt, said distributor belt being movable transversely with respect to the conveying direction and having at least two belt parts which are transversely positioned with respect to each other and movable transversely in unison with each other,
at least two independently operable drives, one drive mechanically coupled to one belt part of said distributor belt and the other drive mechanically coupled to the other belt part of said distributor belt,
wherein groups of products to be outfeed from said infeed belt and to said outfeed belt are arranged into transversely arranged groups completely on said distributor belt.

7. A distributor apparatus in accordance with claim 6, characterized in that at least one distributor belt has substantially the same width as the outfeed belt and is in particular wider than the infeed belt.

8. A distributor apparatus in accordance with claim 6, characterized in that the width dimensions of the two belt parts of said at least one distributor belt are substantially in the ratio 3:1.

9. A distributor apparatus in accordance with claim 6, characterized in that the infeed belt comprises at least two infeed conveyor belts arranged in the conveying direction one after the other, with a front infeed conveyor belt being downwardly inclined in the conveying direction.

10. A distributor apparatus in accordance with claim 6, characterized in that the infeed belt partly overlaps said at least one distributor belt.

11. A distributor apparatus in accordance with claim 6, characterized in that the infeed belt and said at least one distributor belt are spaced vertically apart above one another such that products located on the distributor belt can be conveyed beneath the infeed belt.

12. A distributor apparatus in accordance with claim 6, characterized in tat two distributor belts are arranged in the conveying direction one after the other between the infeed belt and the outfeed belt, with the distributor belts being displaceable independently of one another transversely to the conveying direction and the parts of the distributor belts being driven independently of one another in and counter to the conveying direction.

13. A distributor apparatus in accordance with claim 12, characterized in that the distributor belts are displaceable simultaneously in the same direction or in the opposite direction transversely to the conveying direction.

14. A method for the distribution of products supplied on a conveyor belt using a distributor apparatus in accordance with claim 6 wherein a distribution of the supplied products takes place by a selected driving of the parts of said at least one distributor belt in and counter to the conveying direction and by displacement of said at least one distributor belt transversely to the conveying direction.

15. A distributor apparatus for products comprising
an infeed belt and an outfeed belt, said belts being aligned with each other in a conveying direction with the outfeed belt being positioned after the infeed belt with respect to the conveying direction,
at least one distributor belt arranged in the conveying direction between the infeed belt and the outfeed belt, said distributor belt being movable transversely with respect to the conveying direction and having at least two belt parts which are transversely positioned with respect to each other,
at least two independently operable drives, one drive mechanically coupled to one belt part of said distributor belt and the other drive mechanically coupled to the other belt part of said distributor belt,
wherein said belt parts of said distributor belt are positioned immediately adjacent each other and fixed against transverse movement with respect to each other so tat the belt parts of the distributor belt move transversely as a unit.

16. A method for the distribution of products supplied on a conveyor belt using a distributor apparatus in accordance with claim 15 wherein a distribution of the supplied products takes place by a selected driving of the parts of said at least one distributor belt in and counter to the conveying direction and by displacement of said at least one distributor belt transversely to the conveying direction.

17. A distributor apparatus for products comprising
an infeed belt and an outfeed belt, said belts being aligned with each other in a conveying direction with the outfeed belt being positioned after the infeed belt with respect to the conveying direction, said inked belt and said outfeed belt being spaced apart from each other by a gap in the conveying direction, at least one distributor belt arranged in the conveying direction between the infeed belt and the outfeed belt, said distributor belt being movable transversely with respect to the conveying direction and having at least two belt parts which are transversely positioned with respect to each other, at least two independently operable drives, one drive mechanically coupled to one belt part of said distributor belt and the other drive mechanically coupled to the other belt part of said distributor belt, wherein said distributor belt is positioned along said gap, said distributor belt having a length in the conveying direction such that said distributor belt bridges said gap.

18. A method for the distribution of products supplied on a conveyor belt using a distributor apparatus in accordance with claim 17 wherein a distribution of the supplied products takes place by a selected driving of the parts of said at least one distributor belt in and counter to the conveying direction and by displacement of said at least one distributor belt transversely to the conveying direction.

19. A method for distributing products comprising the steps of providing an infeed belt and an outfeed belt, aligning said infeed belt and said outfeed belt with each other in a conveying direction with the outfeed belt being positioned after the infeed belt with respect to the conveying direction, providing at least one distributor belt arranged in the conveying direction between the infeed belt and the outfeed belt, said distributor belt being movable transversely with respect to the conveying direction and having at least two belt parts which are transversely positioned with respect to each other, providing at least two independently operable drives, one drive mechanically coupled to one belt part of said distributor belt and the other drive mechanically coupled to the other belt part of said distributor belt, wherein groups of products to be outfeed from said infeed belt and to said outfeed belt are arranged into transversely arranged groups completely on said distributor belt.

20. A method for distributing products comprising the steps of providing an infeed belt and an outfeed belt, aligning said infeed belt and said outfeed belt with each other in a conveying direction with the outfeed belt being positioned after the infeed belt with respect to the conveying direction, providing at least one distributor belt arranged in the conveying direction between the infeed belt and the outfeed belt, said distributor belt being movable transversely with respect to the conveying direction and having at least two belt parts which are transversely positioned with respect to each other, providing at least two independently operable drives, one drive mechanically coupled to one belt part of said distributor belt and the other drive mechanically coupled to the other belt part of said distributor belt, wherein said belt parts of said distributor belt are positioned immediately adjacent each other and fixed against transverse movement with respect to each other so that the belt parts of the distributor belt move transversely as a unit.

21. A method for distributing products comprising the steps of providing an infeed belt and an outfeed belt, aligning said infeed belt and said outfeed belt with each other in a conveying direction with the outfeed belt being positioned after the infeed belt with respect to the conveying direction, said infeed belt and said outfeed belt being spaced apart from each other by a gap in the conveying direction.

providing at least one distributor belt arranged in the conveying direction between the infeed belt and the outfeed belt, said distributor belt being movable transversely with respect to the conveying direction and having at least two belt parts which are transversely positioned with respect to each other, providing at least two independently operable drives, one drive mechanically coupled to one belt part of said distributor belt and the other drive mechanically coupled to the other belt part of said distributor belt, wherein said distributor belt is positioned along said gap, said distributor belt having a length in the conveying direction such that said distributor belt bridges said gap.

* * * * *